United States Patent

[11] 3,626,385

| [72] | Inventor | Geert H. Bouman<br>Yorktown Heights, N.Y. |
|---|---|---|
| [21] | Appl. No. | 889,201 |
| [22] | Filed | Dec. 30, 1969 |
| [45] | Patented | Dec. 7, 1971 |
| [73] | Assignee | International Business Machines<br>Corporation<br>Armonk, N.Y. |

[54] TIME-SHARED NUMERICAL CONTROL SYSTEM
8 Claims, 12 Drawing Figs.

[52] U.S. Cl. .................................................. 340/172.5,
235/151.11, 318/562
[51] Int. Cl. .................................................. G05b 15/00,
G06f 9/18
[50] Field of Search .......................................... 340/172.5;
235/151.11; 318/562

[56] References Cited
UNITED STATES PATENTS

| Re. 26,832 | 3/1970 | Randlev | 340/172.5 |
| 3,099,818 | 7/1963 | Murray | 340/172.5 |
| 3,145,295 | 8/1964 | Weighton et al. | 340/172.5 X |
| 3,393,300 | 7/1968 | Jennings et al. | 340/172.5 X |
| 3,439,346 | 4/1969 | McGee | 340/172.5 |
| 3,465,298 | 9/1969 | La Duke et al. | 340/172.5 |

Primary Examiner—Raulfe B. Zache
Assistant Examiner—Melvin B. Chapnick
Attorneys—Hanifin and Jancin and Graham S. Jones, II ABSTRACT: A data processing machine capable of providing numerical control of a plurality of numerically controlled multislide machine tools or other motion machinery on a time-sharing basis operable in response to request signals associated with the machine tools from sources located either internally or externally of their control systems, on an interleaved basis. The machine completes one sequence instruction or a single sequence of a multisequence instruction at a time for each machine tool controller, stops and seeks a request from the next tool controller in priority and then proceeds to service such next tool controller. Output data from the machine are directly connected to the inputs of the controllers from the logic of the machine without intervening buffering.

FIG. 1

INVENTOR
GEERT H. BOUMAN

BY *Graham S. Jones, II*
ATTORNEY

FIG. 4E ics system for a plurality of numerically controlled devices.
3,626,385

TIME-SHARED NUMERICAL CONTROL SYSTEM

BACKGROUND OF INVENTION

1. Field of Invention

This invention relates to time-shared, central control systems for a plurality of numerically controlled devices.

2. Description of the Prior Art

Heretofore, computers have been widely employed for the purpose of providing numerical-control tapes for controlling motive means for devices including machine tools. Several schemes for direct numerical control by means of a time-shared computer have been proposed. In U.S. Pat. application Ser. No. 697,849 of Bottles et al., commonly assigned, and now U.S. Pat. No. 3,573,738, a plurality of machine tools are coupled to a time-shared computer for providing a parallel word to the machine tool in response to a request for an output pulse by an external demand pulse oscillator. One such oscillator is employed for each machine tool, located either at a controller near the machine tool or alternatively near the time-shared computer for the purpose of timing the operation of the machine tool. Thus in the Bottles et al. application Ser. No. 697,849 the several machine tool controllers receive data on an interleaved, time-shared basis in synchronism with external demand request signals generated by the demand pulse oscillators. In addition, the time-shared digital computer is so programmed that an output buffer is connected between the interpolating programs and the various output registers for the several machine tools. The output buffer includes a plurality of word positions, i.e., a table, for each machine tool, so that the interpolating program performs several successive interpolations for each machine tool, until it has completely filled the word positions (the table) in the output buffer for a given machine tool. Then the interpolating program will proceed to perform a series of calculations comprising the table for another machine tool.

Thus, for each machine tool, a chain of interpolation calculations is performed, seriatim, in an uninterrupted fashion until the entire table therefore in the output buffer is completely filled with numbers. Then the tables are read out independently, asynchronously, under independent timing control from a series of independent demand oscillators or clocks by the various machine tools. This technique of time-sharing computer operation among several machine tools with an output buffer was employed so that the computer could be independent of the various machine tools and could operate without interruption.

A problem associated with this type of arrangement is that it requires that a fixed table of values be employed regardless of intervening events which may require variation of the values employed by the computer. This problem is exaggerated when it is desired to control the numerical-control system to adjust its operation either under control of an operator or in an adaptive manner responding to external conditions.

Another problem associated with this prior system comprises the data-processing equipment cost associated with employing high-speed output buffering for a large number of time-shared, numerically controlled machines. As a practical matter, the cost of extremely high-speed output buffering of the kind required to permit efficient operation on a time-shared basis is one which is burdensome. Likewise, for high-demand request signal repetition rates, the associated frequent execution of interpolation programs may become burdensome, or even unfeasible depending on the speed of the digital computer hardware.

Accordingly, an object of this invention is to provide a time-shared, numerical-control data processing system having faster response to signals requiring response.

Further, it is an object of this invention to reduce the equipment cost of buffering in a numerical-control system without interrupting continuity and smooth operation of numerically controlled machines and without reducing the number of machines connected to the time-shared computer.

SUMMARY OF THE INVENTION

In accordance with this invention, a numerical-control system for mechanisms is provided wherein a single-elemental sequence at a time is executed for each controlled mechanism on an interleaved basis, asynchronously between mechanisms synchronized on a request basis for each mechanism, by a system performing a single sequence at a time.

In another aspect, this invention provides a system which includes a time-shared pulse rate calculating means which, in response to mechanism-related individual request inputs, is assigned to the one of a plurality of mechanisms which was associated with the highest priority request for performing a single-pulse rate calculation before transfer to calculation for the next independently and asynchronously request-identified mechanism.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 4 is a representation of the manner in which FIGS. 4A–4F are to be assembled to form a composite, block, schematic diagram.

FIG. 4A–4F comprise segments of the composite, block diagram of a preferred embodiment of this invention which is shown in less detailed form in FIGS. 1 and 2.

FIGS. 4A, 4C and 4F show a special purpose time-shared computer.

FIGS. 4B and 4D show buffer B3 for machine tool 3 which is one of several input buffers for the machine tools.

DESCRIPTION OF THE PREFERRED EMBODIMENT

Figure 1:
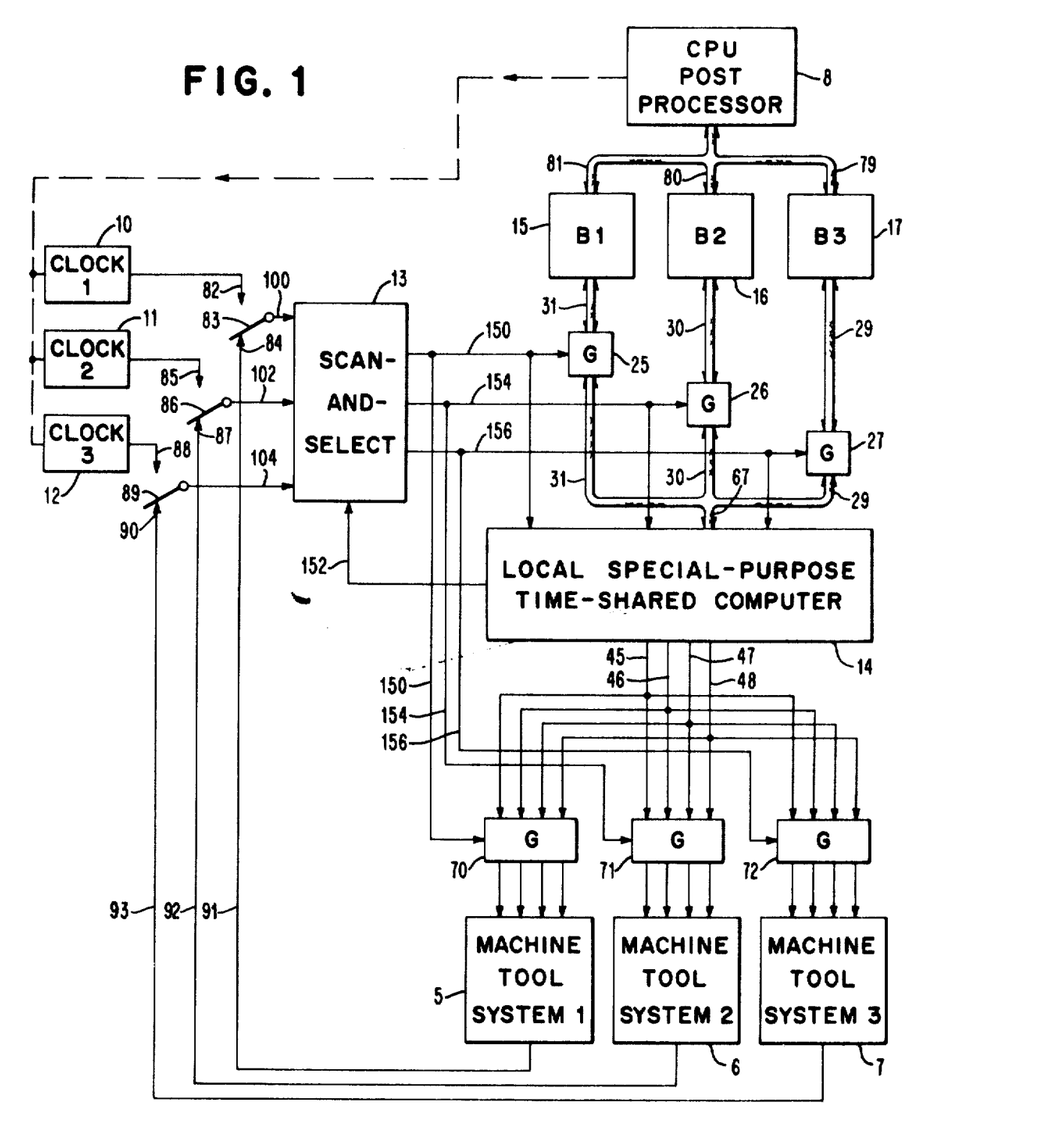
FIG. 1 is a schematic block diagram of a numerical control system in accordance with this invention.

FIG. 1 is a schematic block diagram of a time-sharing numerical control system including a local, special-purpose, time-shared computer 14, a plurality of machine tool systems 5, 6, and 7 and connections to a CPU post processor 8 which may perform a post processor, numerical-control program well in advance of the online machine tool control operation. The CPU post processor 8 provides a plurality of instructions for the various machine tools which are to be driven by numerical-control. Machine tool systems 5, 6, and 7, are operated in response to interpretion by the special-purpose, time-shared computer 14 of the instructions provided by the CPU post processor 8. Instruction data from CPU 8 is supplied through cables 81, 80 and 79 into a plurality of buffer registers B1, 15; B2, 16; B3, 17 by means of lines contained within those cables. An online program in CPU 8 will, as explained below, provide a full set of instruction data to any one of those buffers when needed. Buffer B1, 15 is connected via cable 31 through gate 25 and cable 67 into the local special-purpose, time-shared computer 14. The gate 25 is operated by line 150 from the scan-and-select mechanism 13. The scan-and-select mechanism 13 is adapted to scan its input lines 100, 102, and 104 to determine which one of those lines is requesting service for any one of the machine tools. Single-pole, double-throw switch 83, when up, connects to contact 82 to clock one 10. Line 102 connects to switch 86 which, when up, connects through contact 85 to clock two 11. Line 104 connects through switch 89 which, when up, connects through contacts 88 to clock three 12. The various clocks may be timed to operate at the speed desired for operation of the machine tool systems 5, 6 and 7. For example, the timing of the clocks may be controlled by the CPU post processor output. Clock one 10 corresponds to machine-tool system one 5, etc. When blades 83, 86, and 89 are down, the switches will connect the lines 100, 102, and 104 via contacts 84, 87, and 90 to lines 91, 92 and 93 which are connected to outputs of machine tool systems 5, 6 and 7 respectively. Each of the machine tool systems periodically provides a pulse indicating a request for additional data from the special-purpose time-shared computer 14. Then the scan-and-select mechanism 13 operates any one of the lines 150, 154 or 156 depending upon specific operation of the scan-and-select mechanism 13 which is described in connection with FIG. 4, below. The lines 154 and 156 enable gates 26 and 27, respectively, which permit buffer B2, 16 and buffer B3, 17 to connect through cables 30 and 29 respectively and cable 67 to the computer 14. The computer 14 will provide output on lines 45, 46, 47 and 48 for data for the X and Y slides of a selected machine tool, one line for both positive and negative position increments for both the X and Y slides. Each of lines 45–48 connects to each gate 70, 71 and 72. The lines 150, 154 and 156 are connected to gates 70, 71 and 72 respectively, to cause the particular machine tool system input to be coupled to the output of computer 14 in synchronism with the operation of the computer 14 to perform the algorithm for the given machine tool, which is to receive control data, at the time that the gates are energized. Thus, the single set of outputs 45, 46, 47 and 48 can be connected to any one of all three of the machine tool systems or any desired number. In practice then, since current standard commercial machine tools require something in the order of a maximum of 20,000 pulses per second at full speed operation for each one of the axes of the machine tool, it will be obvious that the scan-and-select mechanism 13 will constantly be assigning the computer 14 at a very high speed to operate on the various axes of the various machine tools. When the computer 14 has completed the performance of an algorithm for a given machine tool, it will then, via line 152, cause the scan-and-select mechanism 13 to scan lines 100, 102, and 104 for a request for operation of computer 14 for a different machine tool system.

Figure 2:
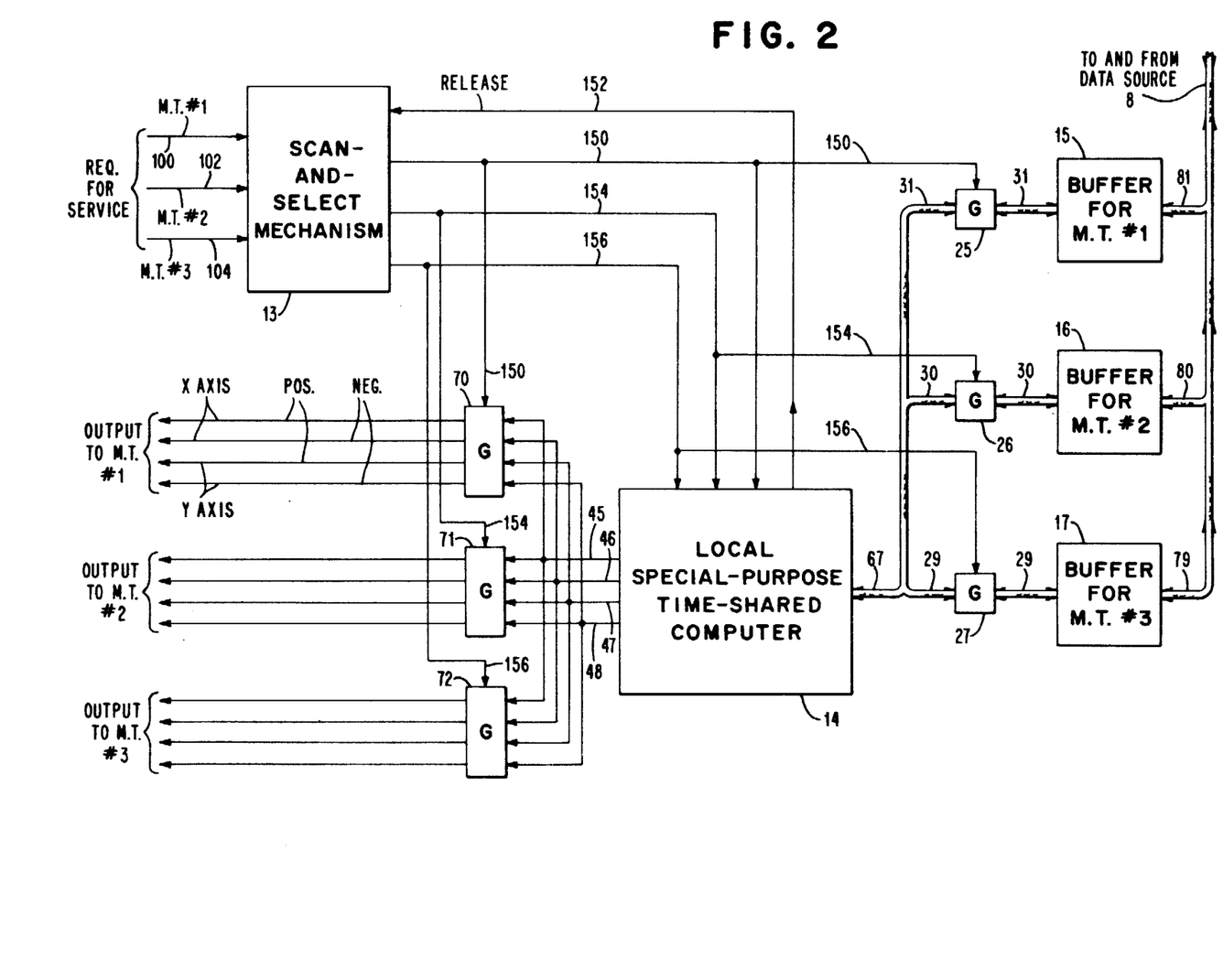
FIG. 2 is a modification of FIG. 1 intended to facilitate correlation of FIG. 1 to FIGS. 4A–4F.

FIG. 2 shows a different arrangement of the elements of the system shown in FIG. 1 which is closely related to the general structure of the system in FIG. 4 and FIGS. 4A–4F. In addition, certain additional details, which will not be described further, are included in FIG. 2 for the purpose of clarifying the relationship between FIG. 2 and the composite FIG. 4. It will be noted that the output gate 70 indicates that certain lines are for the X slide, and, of those, one is for providing positive and one is for negative position increments in the form of pulse signals. Certain other lines are for the Y slide; one is for positive and the other is for negative position increments.

Figures 3, 3A:
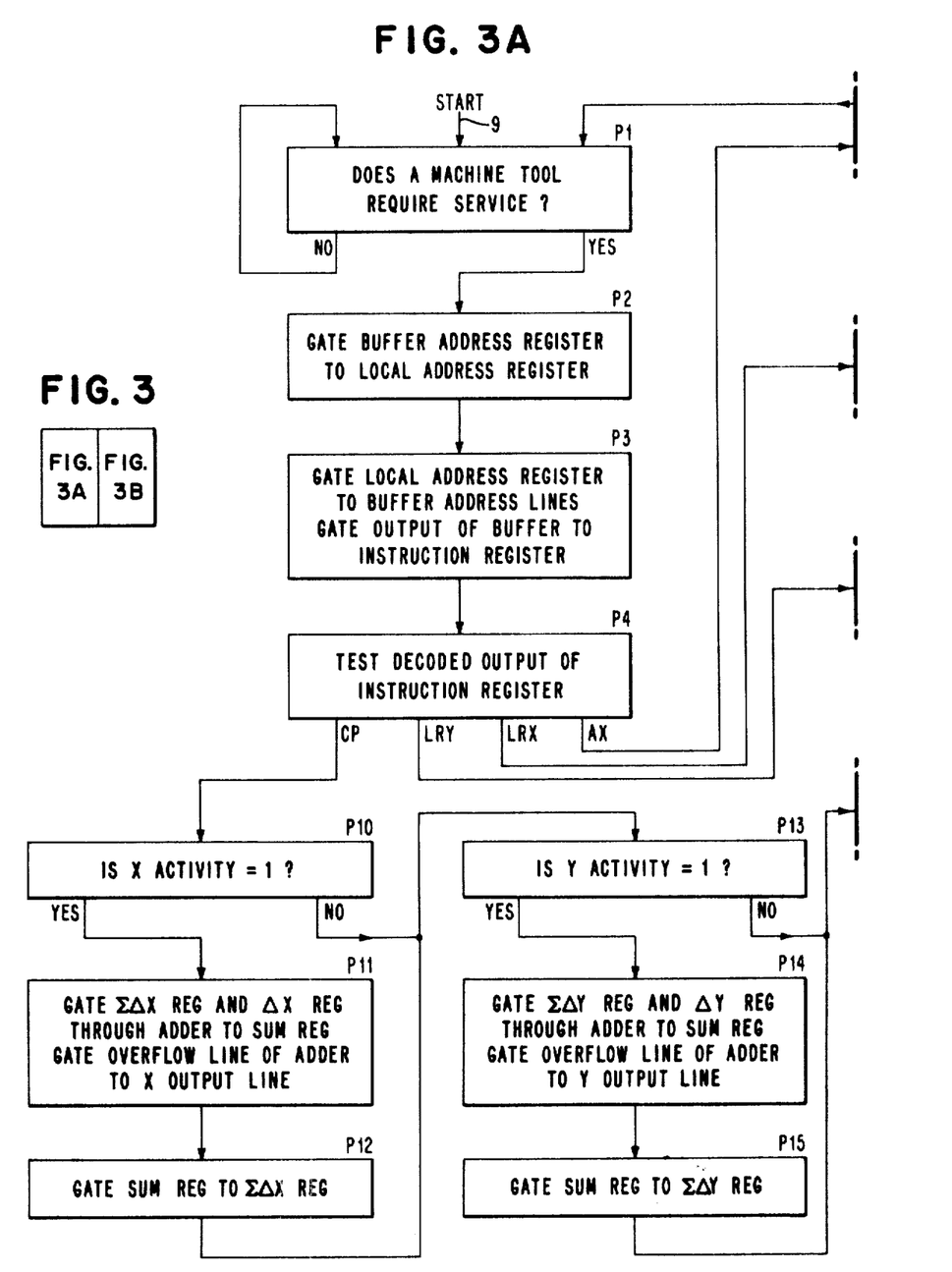
FIG. 3 shows the relationship of FIGS. 3A and 3B.
FIG. 3A and 3B are a flow diagram indicating a method of control of the timing and steps of operation of a time-shared, numerical-control system in accordance with this invention.
Figure 3B:
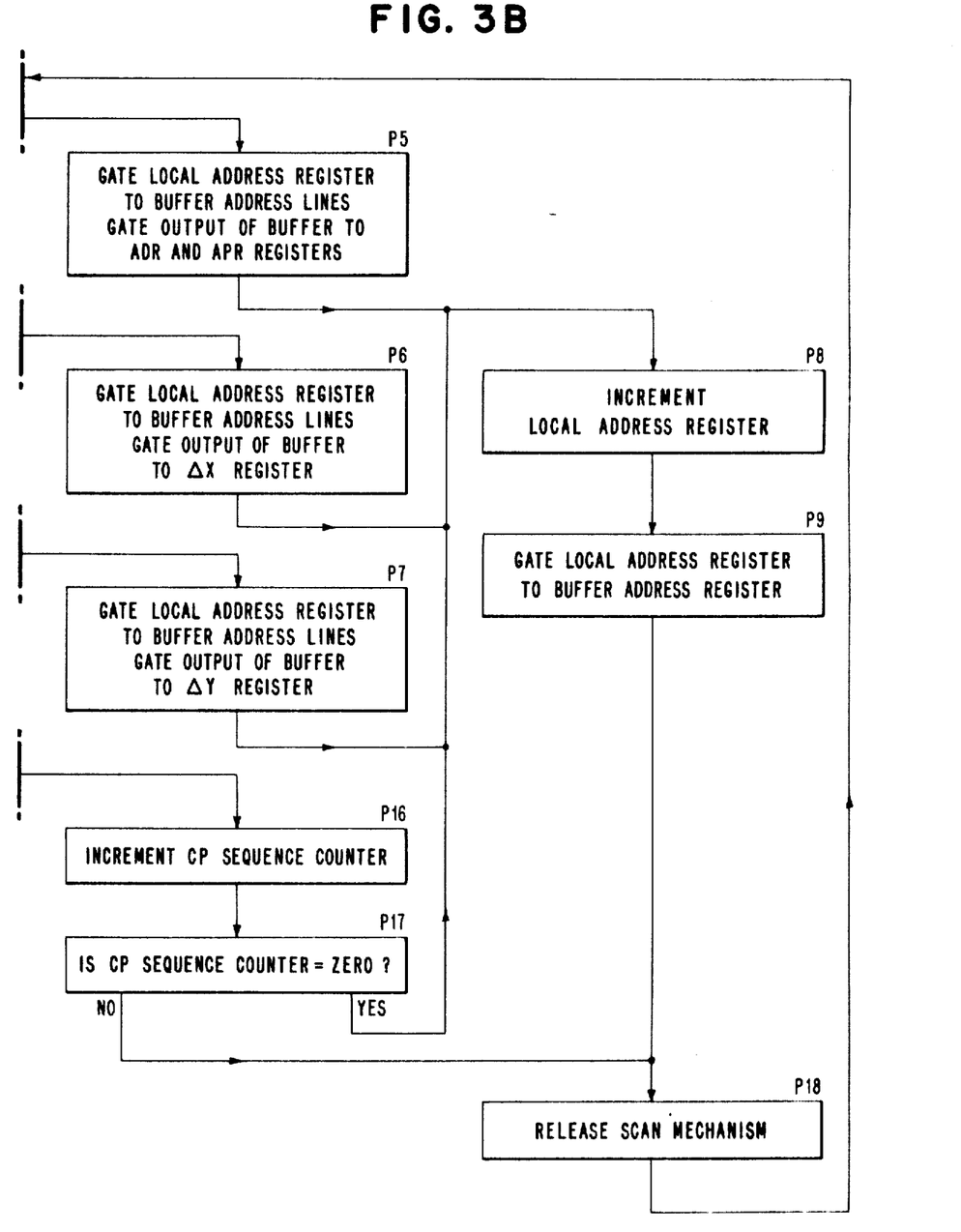

Referring to FIG. 3, it is comprised of two figures 3A and 3B which form a composite. FIGS. 3A and 3B show the general flow chart for the algorithms which are performed by the computer 14 in combination with the scan-and-select mechanism 13. Reference is also made to hardware shown in FIGS. 4A–4F in conjunction with the description of FIG. 3. The material shown in FIGS. 4A–4F will be discussed in greater detail, however, subsequently to discussion of FIG. 3.

Figures 4, 4A:
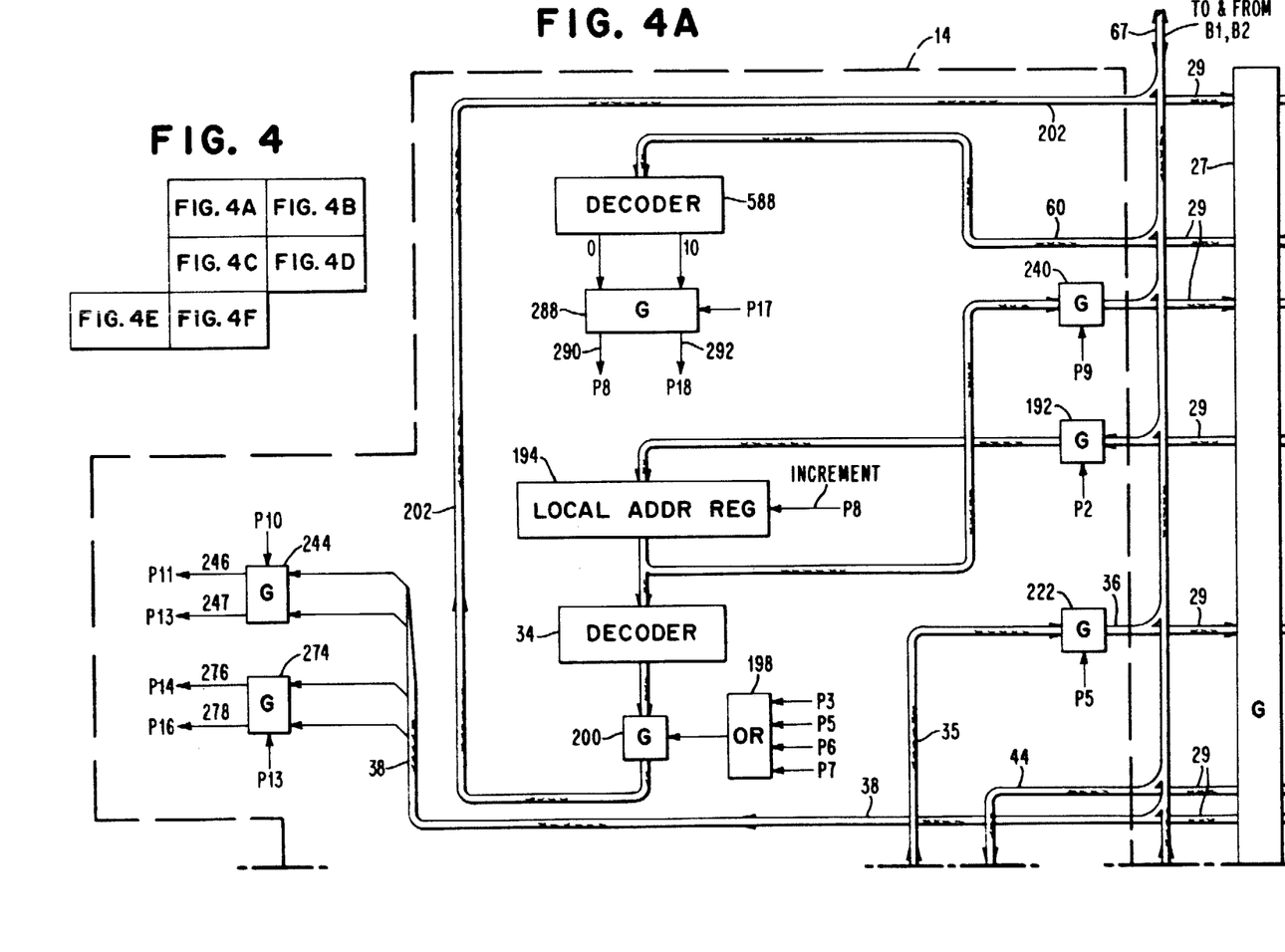
Figure 4B:
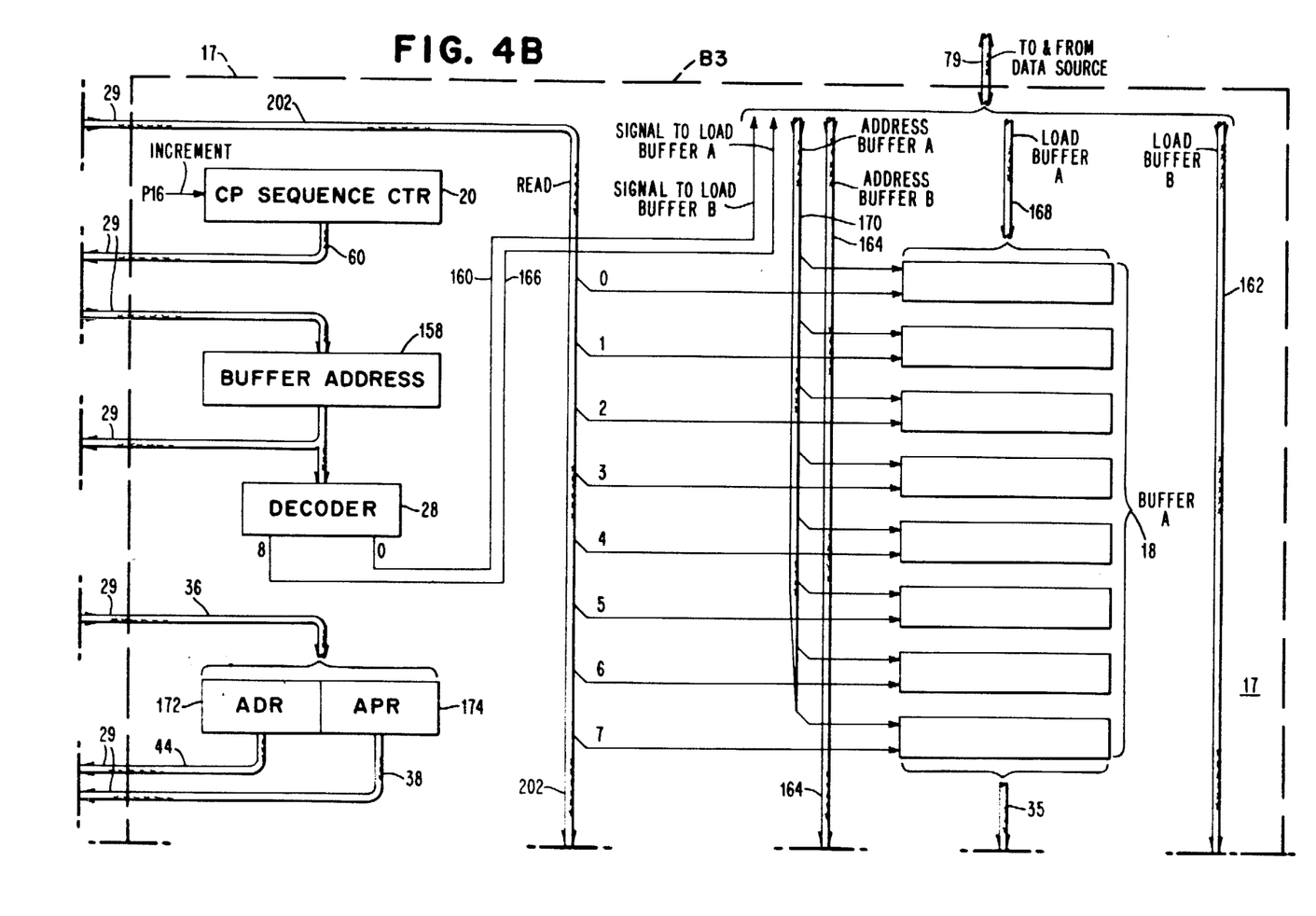

The first step in the program is a routine performed to determine whether a machine tool requires service. This starts when the start control 9 (FIG. 4F) of the machine has been operated. If a machine does not require service, then the scan-and-select mechanism 13 will continue to seek a request for service from one of its inputs (FIG. 4E). If a machine does require service, then the program gates a buffer address register 158 (FIG. 4B) to a local address register 194 (FIG. 4A). The buffer address register 158 is located in one of the buffers B1, 15; B2, 16; and B3, 17 (FIGS. 4B and 4D). The local address register 194 is located in the local, special-purpose, time-shared computer 14.

A third program step is to gate the decoded content of the local address register 194 to the buffer address lines 202 and to gate the buffer content to the instruction register 206. The buffer address lines 202 are those which select given positions in the buffer which may be, for example, buffer B1. In buffer B1, 15 there are sixteen register positions, one of which is selected, at a time, as will be explained in greater detail below. The next step in the third program step, is to gate the output of the active buffer section A or B, 18 or 19 (FIGS. 4B and 4D) through cable 35 into the computer 14 and the instruction register 206 (FIG. 4C) therein which receives instructions as to which of several possible operations is to be performed by computer 14.

In connection with this program there are four basic instructions involved. The four basic instructions involved are referred to as CP, LRY, LRX and AX. The output of instruction register 206 is decoded by decoder 506 to provide CP, LRY, LRX and AX inputs to gate 210.

The AX or axis command is the first command for any motion of the machine tool. It contains information for supply to the axis direction register (ADR) 172 (FIG. 4B) which indicates in which direction the axis will be moving, and the axis activity pattern register (APR) 174 (FIG. 4B) which controls the activity pattern i.e., whether the X and Y axes will be moved during the current computation.

The next instructions are the LRX instruction and the LRY instruction.

The LRX (Load Register X) instruction refers to loading of the ΔX register 22 (FIG. 4D) for the purpose of specifying the total number of unit position increments with which the X-slide is to be advanced later as a result of complete execution of the CP instruction. The LRY (Load Register Y) instruction refers to loading of ΔY register 24 (FIG. 4D) to accomplish the same end for the Y-slide.

The manner in which the contents of the ΔX register 22 and the ΔY register 24 are interpolated by computer 14 will be described below.

The fourth instruction is the CP instruction or the Continuous Path Command. This command means that the machine should be moved as specified by the information stored in registers 22 and 24 during the preceding commands. It may be that the buffer will contain a plurality of CP commands in its registers, after LRY and LRX commands.

If the instruction is AX, then the next function of the machine will be to perform program function 5, P5 which is to gate the local address register 194 to the buffer address lines via cable 202. It also gates the content of one of the buffer registers A and B 18, 19 whichever is selected via cable 35 up into the ADR 172 and the (APR) 174 (FIG. 4B). The ADR 172 and the (APR) 174 are located in the buffer itself. After this has been done, program step P8 follows step P5 automatically and this causes incrementing of the local address register 194 by one count. The output of this register is then supplied in step P9 to the buffer address register 158 which will then have increased its content by one position so that it may cause the next command instruction in buffer 17 to be read through local address register 194 as intermediary, and so on in the prescribed descending numerical order. After step P9 in the program, step P18 follows. Step P18 which occurs at the end of each instruction sequence single-shot 242 generates the P18 clock pulse which causes the release of the scan mechanism 13. The P18 clock pulse is communicated via line 152 to the scan-and-select mechanism 13 in FIGS. 1, 2 and 4E. As shown in FIGS. 3A and 3B, the function of mechanism 13 is to start the P1 step of the program which determines whether a machine tool requires service.

Again the program returns via P1, P2 and P3 to step P4 and this time it is assumed that the computer 14 will have received an instruction calling for LRX which will cause a shift to step P6 in the program which will gate the decoded content of the local address register 194 to the buffer address lines via cable 202 in the buffer of buffer A 18 and buffer B 19 as described above and then will gate the content of the buffer to the ΔX register 22, preparatory to performing interpolation for the X-axis. When that step has been completed, it will cause step P8 to be performed, followed by step P9, followed by step P18 and again the computer will go back to program step P1 to restart the sequence through step P4.

At P4 this time it is assumed that the instruction register 206 calls for operation of instruction LRY which leads to step P7 of the program, which gates the decoded content of the local address register 194 to the buffer lines of the buffer registers A and B, 18, 19. The content of the selected one is then gated to the ΔY register 24 in the buffer 17 preparatory to performing interpolation for the Y axis. This leads back to step P4 again through the same loop as indicated before by P8, P9, P18, P1, P2, P3, and P4.

Before describing the data flow associated with the execution of the continuous path CP instruction, the operation of an interpolation algorithm will be explained. In this instance, the content of the ΔX register 22 is added repeatedly to the content of the ΣΔX register 21 (FIG. 4D) which contains the same number of bit positions as the ΔX register 22. Thus, as a result of an addition, an overflow may or may not occur. However, the average number of overflows occurring as a result of a series of additions will be proportional to the content of the ΔX register 22 and be fairly evenly distributed as the series of additions progresses. In specific numbers, if the ΔX and ΣΔX registers 22 and 21 were to consist of 8 bits each and if a series of 256 additions were to be performed involving 256 CP sequences, the number of overflows produced would equal the content of the ΔX register 22 precisely and the content of the ΣΔX register 21 and the 256 additions would have returned to its original value. The CP sequence counter 20 will overflow at the end of 256 CP sequences and thus signify the end of a CP multisequence instruction.

In the last case it is assumed that a continuous path CP step of the algorithm is to be performed. If CP is selected by the instruction register 206 in step P4, then the next program step is P10. Step P10 tests whether X-axis activity is specified. If not, then the program skips immediately to program step P13; but if so, the program goes through program step P11. Program step P11 calls for gating the contents of the ΣΔX register 21 and the ΔX register 22 through the adder 258 to the sum register 260 with any overflow being supplied by line 262 in FIG. 4C for gating to one of the X output lines 45, 46. Then in step P12, the sum in the register 260 is gated to replace the sum in the ΣΔX register 21 in the buffer. At the end of step P12, step P13 is performed. Step P13 comprises a test to determine whether or not Y activity is specified. If not, then the two steps P14 and P15 are avoided and the program skips to step P16. However, if the answer is yes, then the program goes to step P14. In step P14 the program gates the ΣΔY register 23 and the ΔY register 24 through adder 258 and into the sum register 260, gating the overflow via line 262 into one of the Y output lines 47, 48. After step P14, step P15 gates the content of sum register 260 into the ΣΔY register 23 in the buffer. Next, step P16 increments the CP sequence counter 20 (FIG. 4B) by one count. If the step counter 20 has not yet overflowed and reset to zero by step P16 then in step P17, as indicated by decoder 588, the program immediately goes to the release scan mechanism step P18 marking the end of a sequence of steps, However, if it overflows and thus resets to zero, the computer increments the local address register 194 by means of step P8 and then moves on through step P9 to gate the content of the local address register 194 into the buffer address register 158. When the content of the buffer address register 158 reaches numbers zero and eight, the decoder on lines 160 and 166 will cause a signal to be sent to load either buffer B 19 or buffer A 18 respectively from the general purpose computer 8 through cables 162 and 168 respectively.

While the program employed here is relatively simple and requires using the accumulated values, for example, ΣΔX in 21 and ΣΔY in 23, it will be clear that many other instructions can be stored in the buffer in addition to those described and that the description provided here is a simple one suitable in order to teach the concept involved in connection with this invention.

SCAN MECHANISM

The scan mechanism 13 is shown in FIG. 4E. The timing mechanism for or associated with a machine tool No. 1 can request service by sending a pulse via line 100. That for machine No. 2 can request service by sending a pulse over line 102. That for machine tool No. 3 can request service by sending a pulse over line 104. A pulse on line 100 sets flip-flop 106 to its one state. A pulse on line 102 sets flip-flop 108 to its one state. A pulse one line 104 sets flip-flop 110 to its one state.

A builtin scan clock 111 consisting of single shots 112, 114, and 116 is used to synchronize operation of the mechanism. This clock can be set in motion by applying an initial start pulse to OR-circuit 118. The output of OR-circuit 118 turns single shot 112 to its "on" state, which as a result generates a pulse on line 122 which is effective to reset flip-flops 124, 126 and 128 to their zero states. When single shot 112 goes "off," a pulse is produced on line 130 which turns single shot 114 on, to generate a pulse on line 132 which is used to increment the counter 134. Counter 134 is a modulo 3 counter. When single-shot 114 goes off, a pulse is produced on line 136 which is used to turn single-shot 116 to its on state. This results in a pulse on line 138 which is applied to gate 140. When single shot 116 goes off a pulse will appear on line 142 which, if AND-circuit 120 is enabled, will extend back to OR-circuit 118 and the clock 111 will recycle. It will be noted that AND-circuit 120 is enabled only if flips-flops 124, 126 and 128 connected thereto by lines 125, 127 and 129 are all in their zero states.

If flip-flop 106 is in its one state and the counter 134 is at zero at the time that the pulse on line 138 is applied to gate 140, the active state on line 146 will extend through AND-circuit 144 to set flip-flop 124 to its one state. This same pulse (from line 146) will extend through DELAY-circuit 148 to reset flip-flop 106 to its zero state. It will be noted now that because flip-flop 124 is in its one state, that AND-circuit 120 will not be enabled and therefore the pulse on line 142 when single shot 116 goes to its off state will not extend through AND 120 to OR-circuit 118.

The active state on line 150 is an indication to the local time-shared computer that machine tool No. 1 has requested service. After the service has been supplied, a pulse will be applied to line 152 (from clock line P18 in FIG. 4F) which again starts the scan clock 111 via OR-circuit 118.

AND-circuit 244 is enabled in response to the one state of the counter 134 in conjunction with a one output from flip-flop 108 and is connected to set flip-flop 126 to its one state when enabled. It also resets flip-flop 108 to zero via delay circuit 248. AND 344, flip-flop 128, DELAY-circuit 348 and the zero output of counter 134 are connected similarly.

Referring to FIG. 2, it will be noted that lines 150, 154, and 156 are used to gate the input and the output of the special-purpose, time-shared computer 14, from and to buffers 15, 16, and 17, respectively. The line 152 is also indicated on FIG. 2 and as before stated, this line is used to release the scan mechanism 13.

BUFFER

FIGS. 4B and 4D contain detailed drawings of the buffer 17 of which there are three, 15, 16, and 17, with one for each machine tool. Buffer 17 consists of eight registers which are referred to as buffer A 18, eight registers which are referred to as buffer B 19 and a series of individual registers which are called the step counter 20, the buffer address register 158, the ADR register 172, the APR register 174, the ΣΔX register 21, the ΔX register 22, the ΣΔY register 23 and the ΔY register 24. The buffer address register 158 on FIG. 4B is used to address one of the 16, 16 registers in the A and B buffers 18, 19 through the local address register 194 and decoder 34 as intermediaries. The A buffer 18 and the B buffer 19 contain the instructions for the local special purpose time-shared computer 14. The buffer address register 158 counts from zero to 15 in the binary system and then reverts back to zero. When the content of buffer address register 158 is standing at zero, a signal is produced on line 160 from decoder 28 which is sent back and interrupts the program of the general purpose computer 8 and permits the program in computer 8 to load buffer B 19. Data for the registers of buffer B 19 are sent over subcable 162 of cable 79 and the lines in subcable 164 of cable 29 are used to address the registers in buffer B 19.

When the content of buffer address register 158 is standing at the equivalent of decimal eight, line 166 becomes active, which is a signal to the general purpose computer 8 to load buffer A 18. Data for buffer A 18 is sent over subcable 168 of cable 29 and the lines in subcable 170 of cable 29 are used to address the registers in buffer A 18.

The content of the ADR register 172 in FIG. 4B indicates the direction in which the slides of the machine tool should move. In this embodiment, the ADR register 172 can be a two bit register. The left hand bit can denote the direction that the X slide should move. For example, if this bit is a one, a positive direction for the X slide is indicated. If this same bit is a zero, it would indicate a negative direction for the X slide. In the same manner, the right-hand bit of the ADR register 172 can indicate the direction of movement for the Y slide. For example, if the right-hand bit of the ADR register 172 is a one, it would indicate a positive direction for the Y slide. If the same bit is a zero, it could indicate a negative direction for the Y slide.

In FIG. 4B, the APR register 174 can also be a two bit register. The left-hand bit can indicate the activity for the X slide. For example, if this bit is a one, it may indicate that there is an opportunity for activity for the X slide, i.e., movement in the positive or negative direction. Whether movement will actually occur is dependent upon the fulfillment of other conditions as well. On the other hand, if the left-hand bit is a zero, the X slide cannot be moved irrespective of any other conditions.

In the same manner, the right-hand bit of the APR register 174 can indicate the activity for the Y slide. For example, if this bit is a one, it would indicate that there is an opportunity for movement of the Y slide. If this bit is a zero, it would indicate that there is no opportunity for the Y slide to move.

OPERATION SEQUENCE

Figure 4C:
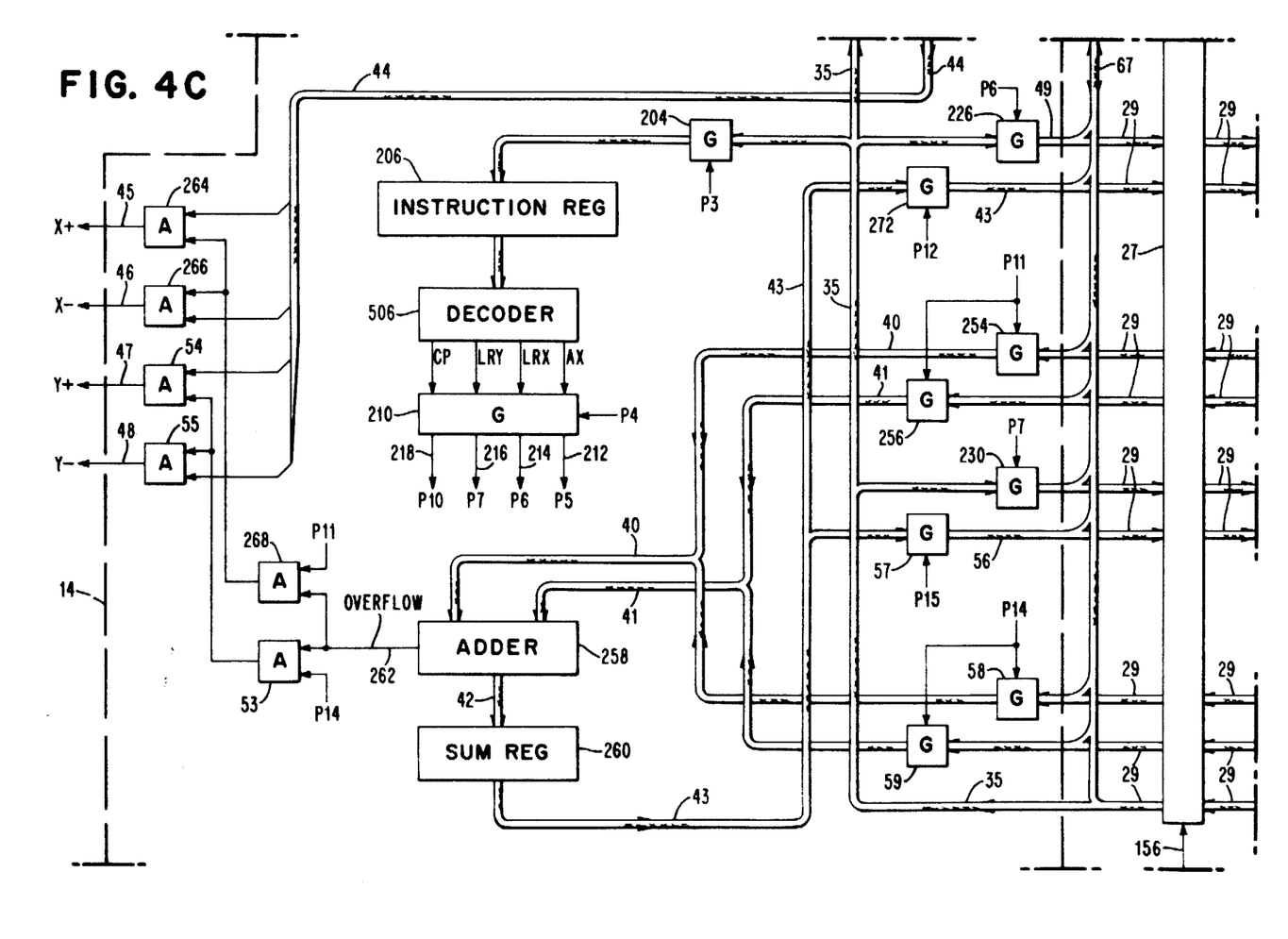
Figure 4D:
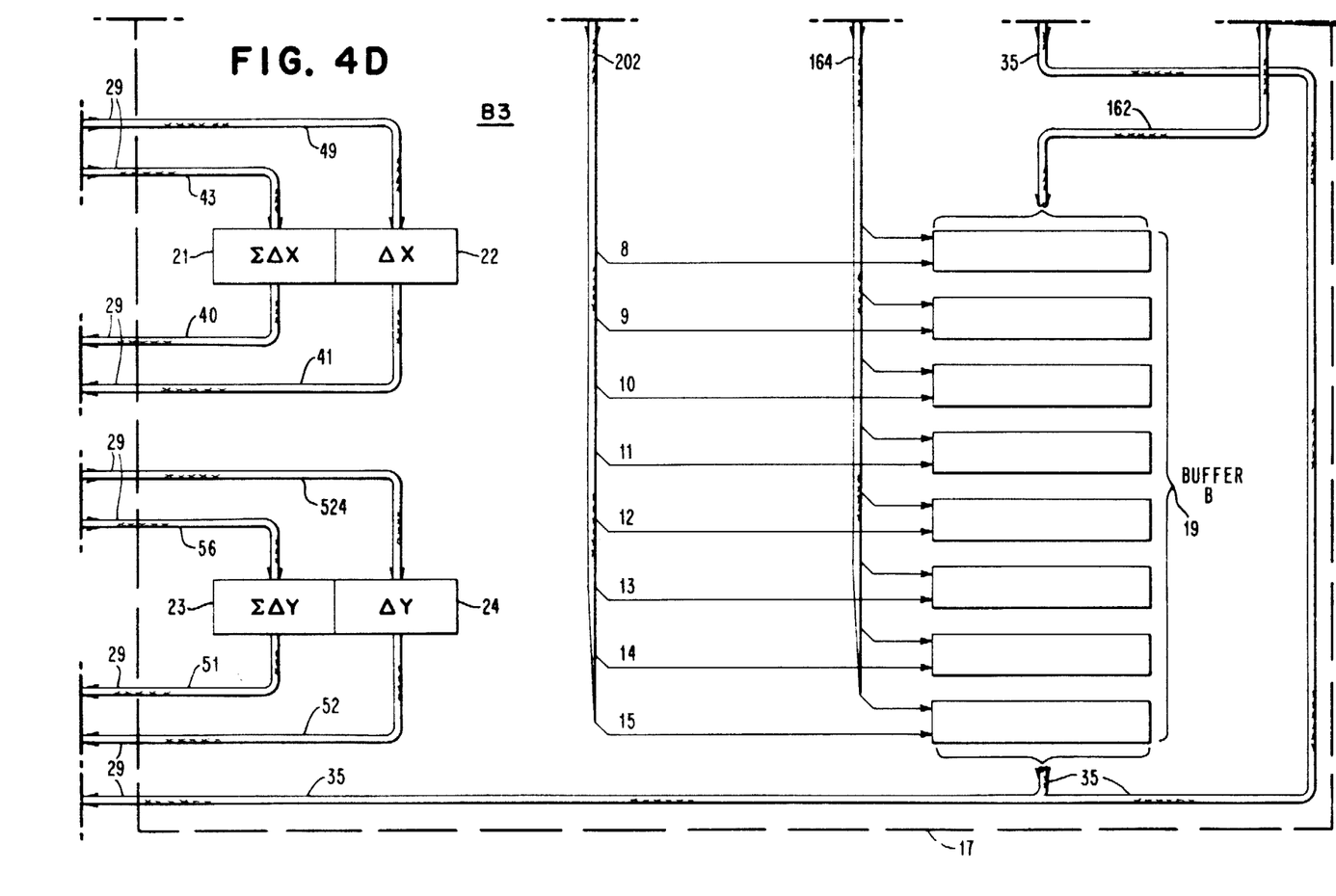
Figure 4E:
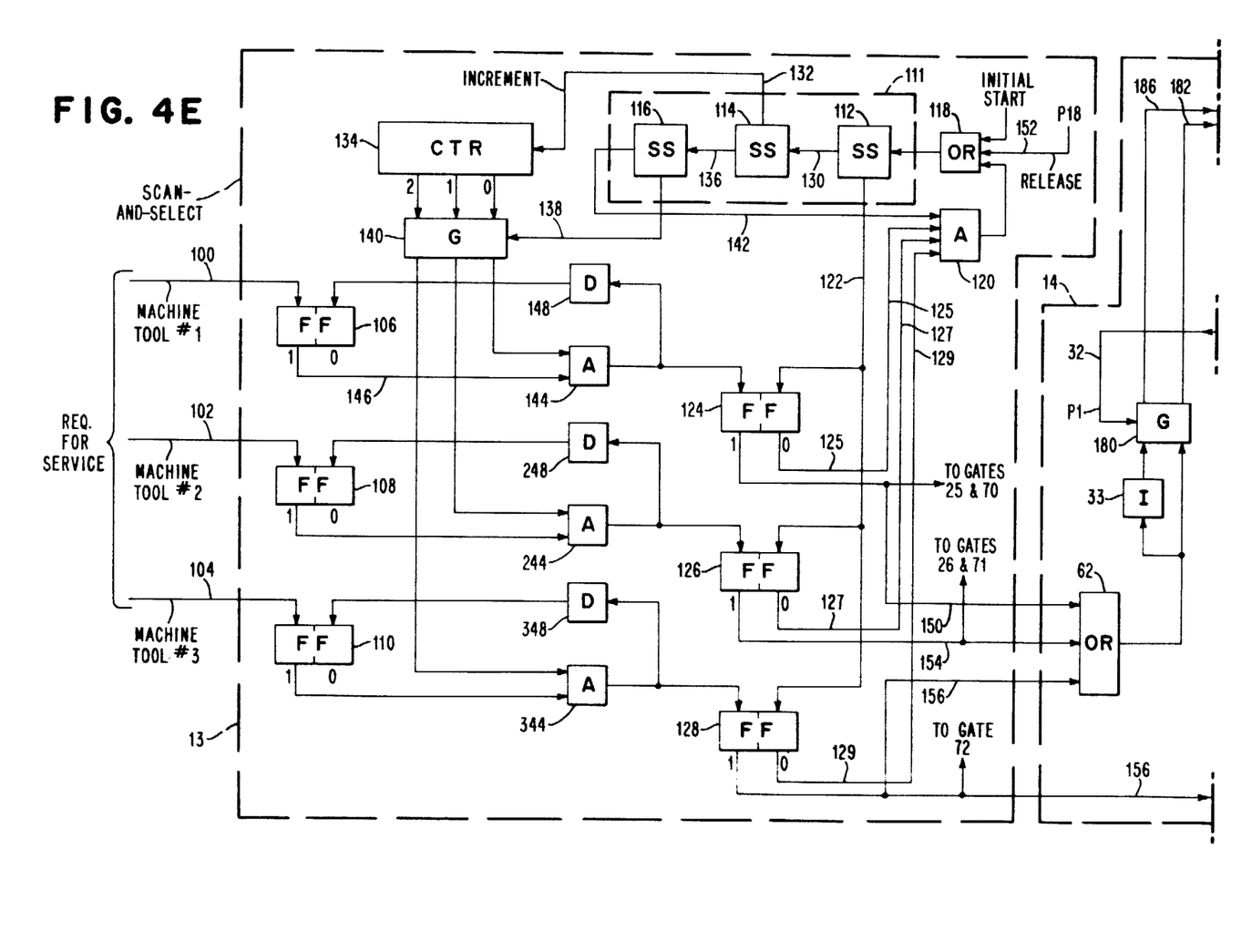
FIG. 4E shows a scan-and-select mechanism.
Figure 4F:
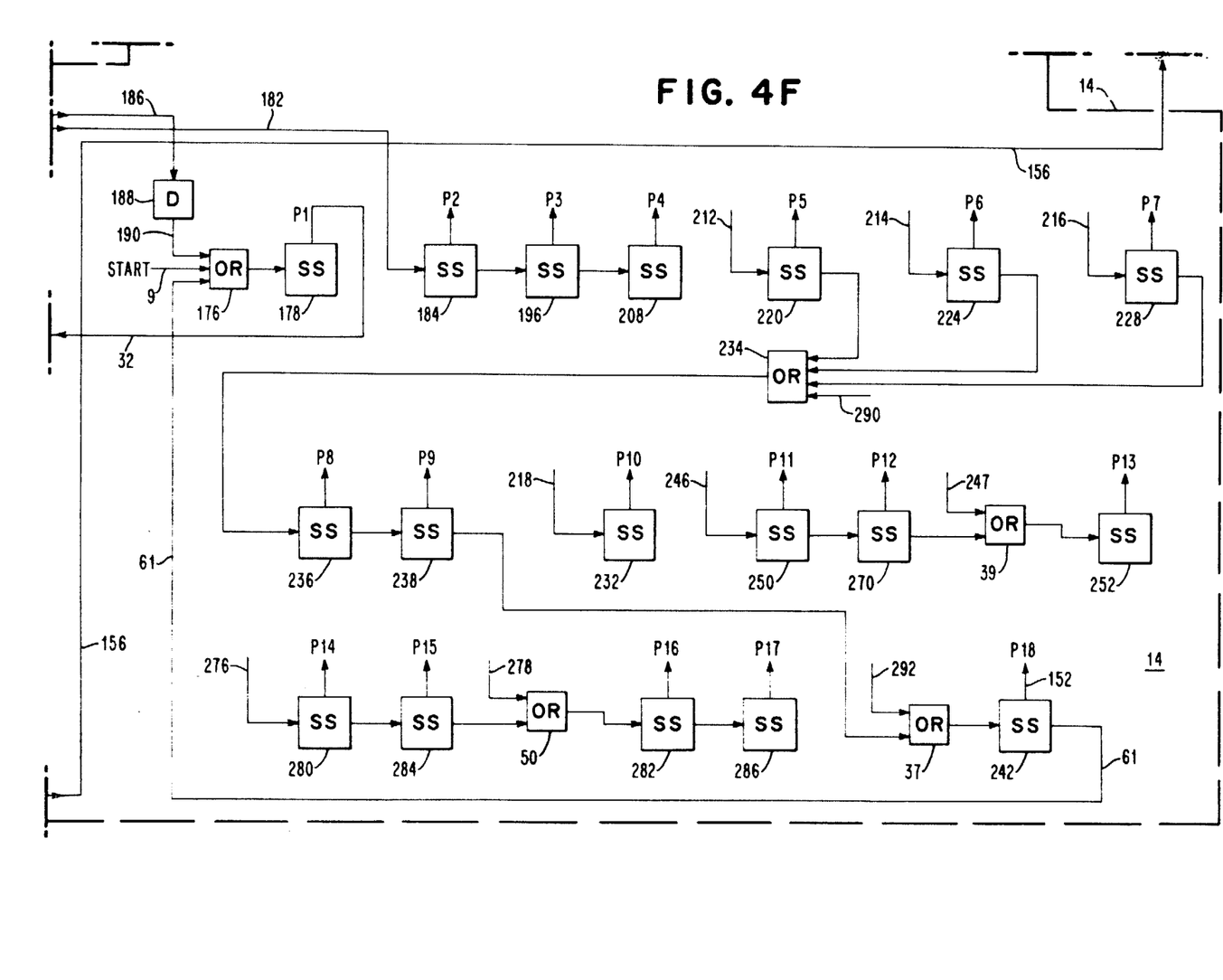
FIG. 4F shows a timing clock for control of the timing in the portions of the special purpose computer shown in FIGS. 4A and 4C.

Reference can next be made to FIGS. 4A, 4B, 4C and 4D and also to the flow chart of FIGS. 3A and 3B and to the microprogram clock which is illustrated in FIG. 4F.

In FIG. 4F, a sequence of events is started by applying a pulse to the OR-circuit 176. This turns on single shot 178 in order to produce a P-1 pulse. The P-1 pulse is applied via line 32 to gate 180 on FIG. 4E. If any of the lines 150, 154 or 156 is active, it will couple through OR 62 and gate 180 and; a pulse will be produced on line 182 which extends to FIG. 4F and is used to turn on single shot 184. If none of the lines 150, 154, or 156 is active, inverter 33 will cause a pulse to extend via line 186, DELAY-circuit 188 and line 190 back to OR-circuit 176 in FIG. 4F in order to start single shot 178 again.

The P-2 pulse from single-shot 184 is applied to gate 192 on FIG. 4A in order to gate the buffer address register 158 (FIG. 4B) to the local address register 194 on FIG. 4A. On FIG. 4F, when single shot 184 goes off a pulse is produced to turn on single shot 196 to produce pulse P-3.

In FIG. 4A, the P-3 pulse is applied to OR-circuit 198, the output of which is applied to gate 200, in order to pass the decoded output of the local address register 194 via decoder 34 on one of the lines in cable 202. It will be noted that cable 202 extends through gate 27 to FIG. 4B and is used to address one of the registers in buffers A and B 18, 19. On FIG. 4C, the P-3 pulse is also applied to gate 204 in order to gate the output of the buffers A and B 18, 19 on cable 35 via gate 27 to the instruction register 206.

On FIG. 4F, when single shot 196 goes off, it will turn on single-shot 208 to produce pulse P-4.

The clock pulse P-4 is applied to gate 210 in FIG. 4C in order to connect a signal to one of the lines 212, 214, 216 or 218. If line 212 becomes active for the purpose of leading to clock pulse P-5, it means that an "AX" instruction has been decoded. Wire 212 extends to FIG. 4F and is used to turn on signal shot 220 which generates clock pulse P-5.

The P-5 pulse is applied to OR-circuit 198 of FIG. 4A in order to enable gate 200. This puts the decoded output of the local address register 194 on the buffer address line contained in cable 202. The P-5 pulse is also applied to gate 222 in order to load the registers ADR 172 and APR 174 from the buffer via gate 27, cable 35 and cable 36.

Referring again to gate 210 in FIG. 4C which is activated by the P-4 pulse, if the instruction decoded were a "LRX" instruction, line 214 would become active. Line 214 extends to FIG. 4F and is effective to turn on single shot 224 to generate clock pulse P-6.

The P-6 pulse is applied to OR-circuit 198 in FIG. 4A in order to address the buffer as before explained. The P-6 pulse is also applied to gate 226 in FIG. 4C in order to gate the output of the buffer 18; 19 via cables 35 and 49 to the register $\Delta X$ 22 in FIG. 4D.

Referring again to the gate 210 in FIG. 4C which is activated by the P-4 pulse, if the instruction happened to be an "LRY" instruction, line 216 would become active. The active state of line 216 extends to FIG. 4F where it is effective to turn on single shot 228 to generate pulse P-7.

The P-7 pulse is applied to OR-circuit 198 in order to address the buffer as before explained. The P-7 pulse is also applied in FIG. 4C to gate 230 in order to gate the output of the buffer to the register $\Delta Y$ 24 via line 524.

Again referring to gate 210 (FIG. 4C) which is tested by the clock pulse P-4, if the instruction happened to be a CP instruction, line 218 would become active. The active state of line 218 extends to FIG. 4F where it is effective to turn on single shot 232 to generate clock pulse P-10.

Before explaining the purpose of the P-10 pulse, it should be mentioned that when single shots 220, 224, 228 go off, OR-circuit 234 (FIG. 4F) will have an output to turn on single shot 236 to generate pulse P-8.

The P-8 pulse is used to increment the local address register 194 in FIG. 4A. When single shot 236 goes off, single shot 238 will be turned on to generate pulse P-9.

The P-9 pulse is applied to gate 240 in FIG. 4A in order to gate the local address register 194 to update the buffer address register 158 in FIG. 4B.

In FIG. 4F, it will be noted that when single shot 238 goes off, single shot 242 will be turned on via OR 37. The action of single shot 242 will be explained later.

Going back to single shot 232 which was turned on by the pulse on line 218, it will be noted that the P-10 pulse generated thereby is applied to AND-gate 244 (FIG. 4A) in order to test the X activity from APR register 174 via gate 27 and cable 38.

If the X activity is equal to one, a pulse will appear on line 246. If the X activity is equal to zero, a pulse will appear on line 247. Line 246 extends to FIG. 4F and is used to turn on single shot 250 to generate P-11. Line 247 extends to FIG. 4F and is used via OR 39 to turn on single shot 252 to generate P-13.

In FIG. 4C, the P-11 pulse is applied to gates 254 and 256 in order to gate the $\Sigma \Delta X$ register 21 and the $\Delta X$ register 22 to the adder 258 via cables 40, 41 and gate 27.

Referring to FIG. 4C, the output of the adder 258 goes via cable 42 into the sum register 260 and an overflow, if it exists, will appear on overflow line 262. The P-11 pulse is also applied to AND-circuit 268 so that the active state of line 262 can extend to AND-circuits 264 and 266. If AND-circuit 264 is enabled by the ADR-register 172, via cable 44 and gate 27, a pulse will be delivered to the machine tool as an X axis positive direction pulse on line 45. If AND-circuit 266 is enabled, the pulse will be delivered to the machine tool as an X axis negative direction pulse on line 46.

When single shot 250 goes off, it will turn on single shot 270 to generate pulse P-12. The P-12 pulse is applied to gate 272 in order to gate the sum register 260 via cable 43 and gate 27 to the ΣΔX register 21. When single shot 270 resets, OR 39 will also activate single shot 252 which generates pulse P-13.

The P-13 pulse is applied to gate 274 in FIG. 4A. If the Y activity is equal to one, a pulse will appear on line 276. If the Y activity is equal to zero, a pulse will appear on line 278. The active state of line 276 extends to FIG. 4F and is used to turn on single shot 280 which generates P-14. The active state of line 278 extends to FIG. 4F via OR 50 and is used to turn on single shot 282. The P-15 pulse generated by single shot 284 when single shot 280 turns off is used to gate the ΣΔY register 23 and the ΔY register 24 via gates 27, 58 and 59 through cables 51, 52, 40 and 41 to the adder 258 to the sum register 260 and also to gate the possible overflow to the proper Y direction lines 47, 48. This operation is exactly the same as that previously described for the X axis with AND 53 activated by P-14 to ANDS 54, and 55.

When single shot 280 goes off, it turns on single shot 284 to generate P-15. The P-15 pulse is used to gate the sum register 260 to ΣΔY register 23 via cables 43, 56 and gate 57. Again, this operation is similar to that described before for the ΣΔX register 21.

When single-shot 284 goes off, it turns on single shot 282, via OR 50, to generate pulse P-16. The P-16 pulse is used to increment the CP sequence counter 20 in FIG. 4B.

When single shot 282 goes off, it turns on single shot 286 to generate P-17. The P-17 pulse is applied to gate 288 in order to test the step counter 20 via cable 60 and gate 27. If the step counter is on zero, a pulse will appear on line 290 of gate 288. If the step counter is not on zero, a pulse will appear on its line 292. Line 290 is one input of OR-circuit 234 (FIG. 4F) and a pulse on line 290 is thus used to turn on single shot 236. In other words, the clock is returned to the P-8 pulse. Line 292 extends to FIG. 4F and is used to turn on single shot 242. The clock pulse P-18 marking the end of a sequence is applied to the line 152 at the top of FIG. 4E in order to release the scan mechanism 111 in FIG. 4E. When single shot 242 turns off, line 61 is active to turn on single shot 178 via OR 176.

What is claimed is:

1. Apparatus comprising:
   means for receiving requests for securing data for each of a plurality of drive mechanisms,
   an asynchronously shared algorithm means for calculating the algorithm for each increment of motion for all said drive mechanisms, serially, said algorithm means calculating only one increment of motion at a time for a selected one of said drive mechanisms;
   means for selectively responding to said requests for securing data from a data storage unit containing motion control data to supply at least some of said motion control data to said algorithm means,
   and means for distributing said data from said algorithm means in a coordinated sequence to said drive mechanisms.

2. A machine-tool, control system including a special-purpose computer, a plurality of drives each having a drive input connected to said computer, control means for producing signals for selectively directing said computer to service successive ones of said drives, said computer including algorithm means for performing an algorithm for generating motion signals, said computer performing an algorithm for generating motion signals, said computer performing only one sequence of said algorithm for each of said drives for each signal from said control means and said computer performing for only one drive at a time serially on a time shared basis, and means for coupling the output of said algorithm means directly to the said drive input associated with the said drive directed to be served by said control means.

3. Apparatus including a plurality of numerically controlled mechanisms providing demand signals, a time-shared, numerical-control algorithm computer for sequential calculation of control signals for said plurality of numerically controlled mechanisms, said computer including an algorithm unit having an output for motion control signals, means for providing direct connection of motion control signals from the output from said algorithm unit to the control inputs of said mechanisms without storage of the output of said algorithm unit in means comprising buffer storage, coupling means for coupling said demand signals from said mechanisms to said computer, said computer including means having an input connected to said coupling means and an output coupled to said algorithm means for providing time sharing of said algorithm unit serially, on demand, asynchronously, in response to said demand signals from said plurality of mechanisms.

4. Apparatus including a plurality of machine tools including numerically controlled mechanisms, each mechanism including a demand output for providing demand signals, calculating means for performing at one time a single calculation for a single mechanism coupled to said demand outputs, said calculating means being time shared asynchronously for performing calculations for other mechanisms in a time priority sequence determined by said demand signals, and distribution means coupled to said calculating means and said demand outputs for supplying an output from said calculating means for each said calculation to the one of said mechanisms corresponding to said time priority sequence.

5. Apparatus comprising:
   plural outputs for connection to machine tool drives,
   means adapted for receiving externally generated requests for supplying data to a given one of said plural outputs,
   a fast data storage unit containing input data,
   means for interpolating input data to provide output signals,
   means for selectively responding to said requests in an asynchronous, interleaved order to secure corresponding input data from said fast data storage unit to supply said input data to the said means for interpolating for providing output signals,
   and means for distributing said output signals to corresponding ones of said output signals to corresponding ones of said outputs from said means for interpolating in a coordinated sequence.

6. A machine tool control system including a special purpose computer, control means for producing signals for asynchronously directing said computer to service successive machine tools having inputs connected to said computer in response to demand signals from said machine tools, said computer including interpolation means for performing a multiple-sequence pulse generation interpolation for generating motion pulses, said computer performing only one sequence of said interpolation for each axis of a machine tool for each signal from said control means only one machine tool at a time on an interleaved basis, and means for coupling said motion pulses directly to the input of the machine tool selected by said control means without delay.

7. Apparatus including a time-shared numerical-control interpolating means for sequential calculation of a stream of pulses for a plurality of numerically controlled machines and providing said stream of pulses at the output thereof, connecting means being adapted to be directly connected to the control inputs of numerically controlled machines without storage of the output of said interpolating means in means comprising buffer storage, time sharing control means for controlling the assignment of said interpolating means to provide a single-motion control calculation at a time, demand lines adapted to be connected to numerically controlled machines shifting of the operation of said interpolating means in response to inputs to said control means from said demand lines and said control means being adapted for providing asynchronous dedication of said interpolation means to one machine tool at a time in response to said control means.

8. Apparatus including a plurality of drives, control means for controlling said drives, each drive having control means associated therewith, a drive instruction calculation unit having a plurality of outputs for said drives, said unit including time-shared means for calculating a single sequence of a multiple-sequence instruction for a single drive by means for providing a separate calculation for a drive at a time for each of a plurality of sequences for said drive, a traffic control unit for controlling the sequence of operation of said calculation unit providing traffic control signals, each drive including requesting means for a given drive coupled to said traffic control unit, each calculation providing an output in response to each traffic control signal for the drive corresponding to said traffic control signal, interleaved asynchronously with calculations and outputs for other drives and the one of said outputs corresponding to a said single drive supplying each of said outputs to said controller for said drive directly without intervening inactive storage of said output.

* * * * *